July 31, 1928.
G. E. PAGE
APPARATUS FOR BAKING FOOD PRODUCTS
Filed Oct. 7, 1924
1,679,052
3 Sheets-Sheet 1
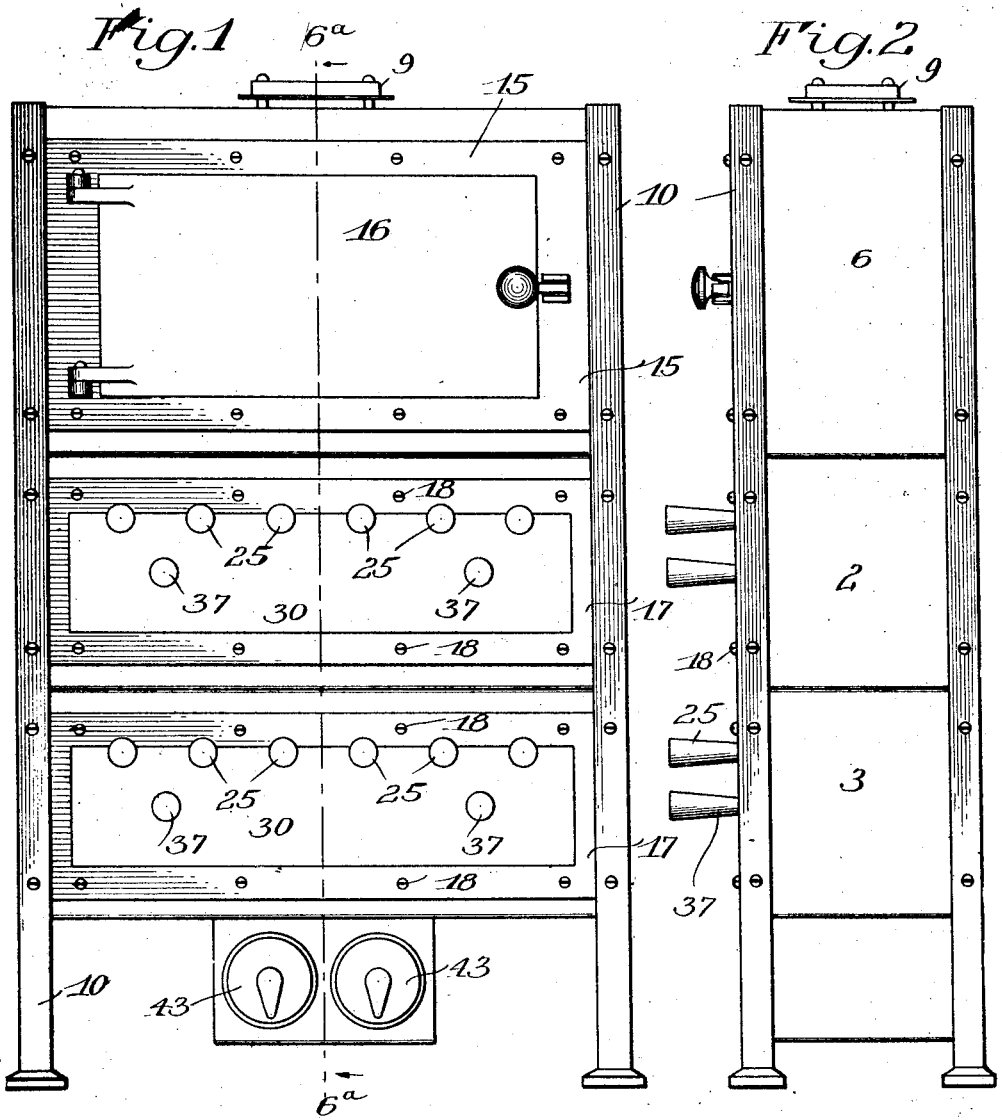

July 31, 1928.

G. E. PAGE 1,679,052

APPARATUS FOR BAKING FOOD PRODUCTS

Filed Oct. 7, 1924   3 Sheets-Sheet 2

INVENTOR.
George E. Page
BY
his ATTORNEY

July 31, 1928.  
G. E. PAGE  
1,679,052  
APPARATUS FOR BAKING FOOD PRODUCTS  
Filed Oct. 7, 1924  3 Sheets-Sheet 3
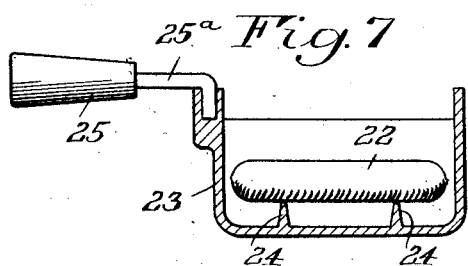
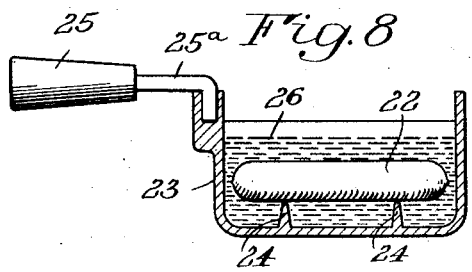
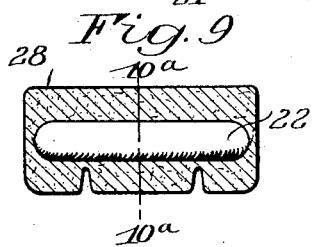
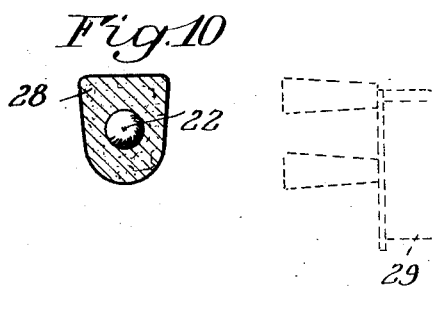
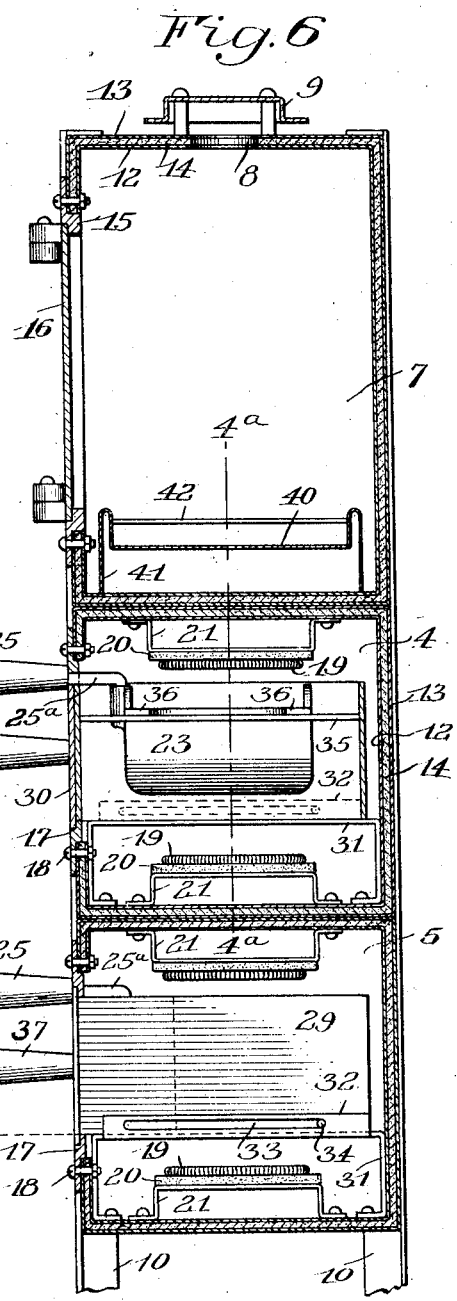
INVENTOR.  
George E. Page  
BY  
his ATTORNEY Patented July 31, 1928.

1,679,052

UNITED STATES PATENT OFFICE.

GEORGE E. PAGE, OF ROCHESTER, NEW YORK, ASSIGNOR, BY MESNE ASSIGNMENTS, TO PAUL S. PAULSON, OF ROCHESTER, NEW YORK.

APPARATUS FOR BAKING FOOD PRODUCTS.

Application filed October 7, 1924. Serial No. 742,221.

My invention relates to methods and apparatus for making articles of food such as meat rolls, and has for one object to provide an advantageous process for making meat rolls of improved flavor and other qualities. A further object of the invention is to provide an improved cooking stove particularly designed to afford efficient means for the unitary control of a number of separate food containers with uniform application of the heat to all parts of the containers, as well as to provide improvements in the latter which will facilitate the handling and cooking of the rolls.

To these and other ends the invention consists in certain improvements and combinations of parts, all as will be hereinafter more fully described, the novel features being pointed out in the claims at the end of the specification.

In the drawings:

Figure 1 is a front elevation of a stove comprising certain features of the invention;

Figure 2 is a side elevation of the same;

Figure 3 is a fragmentary front elevation of one of the baking compartments with the closure therefor removed;

Figure 6 is a sectional elevation taken on the line $6^a$—$6^a$ of Figure 1;

Figure 7 is a longitudinal section through one of the cups or containers showing the manner of supporting a sausage therein;

Figure 8 is a similar section showing the batter surrounding the sausage;

Figure 9 is a longitudinal section through one of the sausage rolls baked in the container shown in Figure 8, and Figure 10 is a cross section through the same taken on the line $10^a$—$10^a$ of Figure 9.

Similar reference numerals throughout the several views indicate the same parts.

Figure 4:
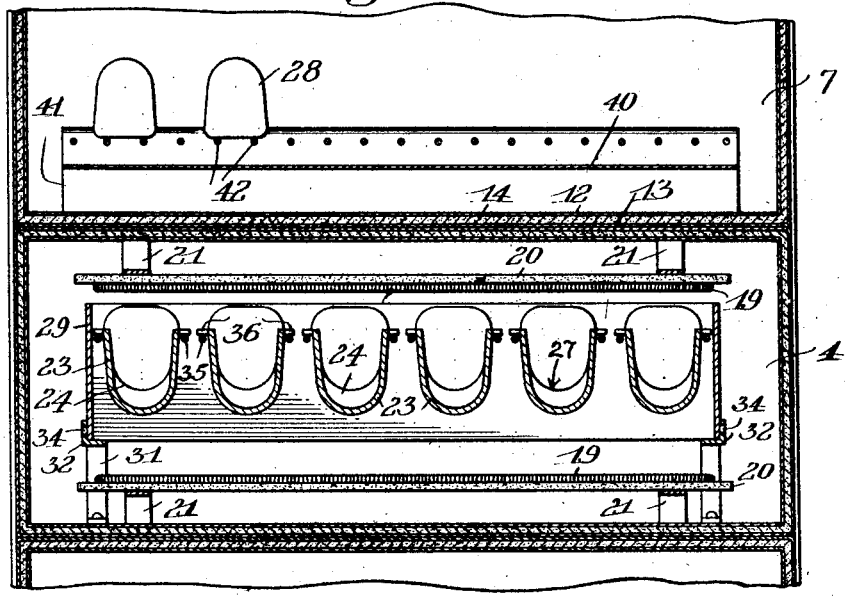
Figure 4 is a transverse sectional elevation taken on the line $4^a$—$4^a$ of Figure 6.

In the present embodiment of my invention I provide a stove 1 of novel construction which is particularly adapted for use in the production of meat rolls of the character disclosed by my improved process as described hereinafter. The stove preferably comprises the upper and lower sections 2 and 3 respectively, which form baking or cooking compartments 4 and 5. A top section 6 is superimposed upon the upper section and forms a warming compartment 7 having a ventilating opening 8 protected by a cover 9 as shown in Figure 6.

The several sections are preferably constructed as separate units and superimposed one upon another and held together by the upright frame members 10 which are preferably L shaped in cross section and which are connected with the sections by means of suitable bolts or screws 11. The sections are each constructed of inner and outer sheet metal plates as indicated at 12 and 13 with a layer of suitable insulating material 14 disposed therebetween. The top section 6 is provided with a door frame 15 to which is suitably hinged a door 16 as shown in Figures 1 and 6.

The baking sections 2 and 3 are provided with door closure frames 17 suitably bolted to the sections as indicated at 18 in Figure 6.

Mounted within each of the cooking compartments 4 and 5 and preferably upon the upper and lower walls thereof are electric heating coils 19 which are preferably disposed upon asbestos pads 20 carried by brackets 21 which are suitably connected with said walls as shown in Figure 6.

While I preferably employ electric heaters for cooking the sausage rolls within the several compartments it will be understood that other suitable heating means may be substituted therefor if desired.

In my improved method of producing the sausage or other kinds of meat rolls, I first preliminarily cook the sausage, as by parboiling or otherwise, as may be found desirable. The precooking of the sausage is found to be essential in avoiding a soggy condition of the batter or dough after it has been baked around the meat. By preheating or partially cooking the sausage I bring it to a state of preparation which greatly improves it as a filler for the roll and which also renders it more digestible.

After preliminarily cooking the sausage indicated at 22 in Figure 7, I preferably place it in a suitable cup or container 23, upon the supporting ribs 24 thereof, which serve to hold the sausage in spaced relation to the walls of the container, the cup having a suitable handle as indicated at 25. A batter indicated at 26, which may contain any desired ingredients, is poured into the container until the sausage becomes immersed within, or enveloped by the batter. However, if preferred the batter may first be placed within the cup and the sausage or other meat portion then dropped into the batter. The sausage will, if dropped into the batter, become deposited centrally upon the ribs of the cup, since they slope or curve inwardly toward the center thereof as indicated at 27 in Figure 4. With the sausage thus enveloped within the batter the cup is placed in the stove or oven and baked to the desired degree to produce the completed roll as shown at 28 in Figures 9 and 10. The baking is preferably done with the cups left uncovered, since it is found that better results are thus obtained than by cooking the rolls in a closed container.

The sausage rolls produced by this method are very much better than those made in the old way, by splitting a roll and inserting a toasted sausage therein. The precooking of the sausage and the subsequent baking of the same within the surrounding batter greatly improves the tastiness of the roll, which is partly due to the fact that the batter becomes permeated with the flavor of the meat.

Another advantage afforded by my improved method is that the roll and the sausage are both heated at the same time and to the same degree and can be served hot as a single food portion of equal content but of considerably smaller proportions than the present split sausage rolls.

The baking of the precooked sausage within the surrounding batter has the effect of softening the meat and of retaining the desirable flavoring qualities thereof which, to a considerable extent, are driven out by the old method of roasting the sausage on a hot plate.

The present form of stove construction has been designed with the particular object in view of providing means for conveniently carrying out the method described above and for handling and baking a considerable number of the rolls at a time, as well as for the uniform application of heat to all parts of the cups containing the material to be baked.

Figure 5:
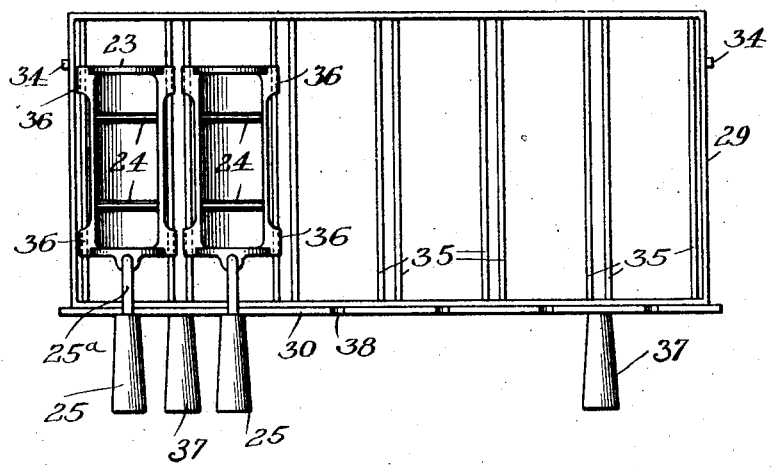
Figure 5 is a plan view of a frame for supporting a series of cooking containers within the stove.

To facilitate the handling of a considerable number of rolls for each baking operation I provide a holder for the cups, comprising a rectangular sheet metal frame 29 which is open at the top and bottom. The front side of the cup supporting frames for each of the compartments 4 and 5 forms a closure therefor as shown in Figure 6. The frames are preferably provided with front stiffening plates 30 which are disposed within the recessed portions of the frames 17, surrounding the openings leading to said compartments. The frames 29 are slidable within the compartments upon the supporting brackets 31 which carry upstanding flanges 33 to receive the laterally projecting pins 34 of the frames as shown in Figures 4 and 5. With this construction the frame or cup holder is limited in its outward movement to the position indicated by dotted lines in Figure 6 in which position it is held and supported by engagement of the pins 34 with the flanges 32.

The frame is provided with a plurality of sets of transversely extending bars 35 between which are disposed the cups 23, the latter being supported by the four corner lugs 36 thereof which rest upon the bars as shown in Figure 5. The cup holding frames are provided each with a pair of handles 37 by which they are moved to and from closing position with respect to the baking compartments.

The handles 25 of the cups serve to limit the inward movement of the latter upon the bars 35 by engaging the front plate 30 of the frame, which is notched as shown at 38 to receive the reduced portions $25^a$ of the handle. In this way the cups are properly aligned centrally of the baking compartments to afford an even distribution of the heat on all sides thereof.

The door frames 17 of the stove are correspondingly notched at their upper edges as indicated at 39 in Figure 3, the handle portions $25^a$ resting in said notches when the cup holder is in closing position with respect to the oven. With the holder moved to the position shown by dotted lines in Figure 6, the cups can be readily removed from or deposited within the frame as desired. The handles 25 remain outside of the stove when the holder is in closing position and thus do not become excessively heated and are always in convenient reach of the operator.

By suspending the cups within the open frame-like holders approximately at the center of the baking compartment, they are surrounded on all sides by heated air. By placing the heaters both above and below the cups or suspending the latter between the heaters at a substantially equal distance therefrom, a more uniform heating effect is produced than could be effected with a single heater disposed at one side of the cups.

In the warming compartment 7 I have provided a pan 40 having downturned supporting portions 41 as shown in Figure 6, the pan being preferably provided with a plurality of cross bars 42 for receiving the rolls 28 as shown in Figure 4.

A pair of electric switches 43 are suitably supported preferably at the bottom of the stove for turning on and off the current for heating the coils 19, which is supplied from a suitable source not shown.

I claim as my invention:

1. In combination, a stove having a heating compartment, spaced supports mounted therein, a frame slidably disposed within the compartment upon the supports, one side of the frame forming a closure for said compartment, a plurality of sets of spaced rods extending from the front to the back of the frame in a horizontal plane, a plurality of cooking utensils depending between and supported by the several sets of rods, guides upon the support for said frame, slots formed within the guides, and pins projecting from the frame within the slots and adapted to limit the outward movement of the frame.

2. In combination, an oven, a frame mounted for movement within the oven including a closure element therefor, a plurality of spaced bars carried by the frame, a series of containers disposed between the bars and having projecting portions adapted to rest thereon, said frame and containers being movable as a unit to a position permitting removal of the containers from the frame without removal of the latter and handles upon the containers adapted to project from the oven when the closure element is in closed position.

3. In combination, an oven, a closure for the oven, a frame disposed within the oven and connected with the closure and a cooking container supported within the oven upon the frame and having a handle projecting from the oven through the closure when the latter is in closed position.

4. In combination, a stove having a heating compartment, spaced supports mounted therein, a frame slidably disposed within the compartment upon the supports and including front and rear plate members and a series of bars disposed in a horizontal plane and extending between the top and bottom of the frame from front to rear and having their ends connected with said plate members to form supports for a series of cooking utensils, the front plate member forming a closure for said compartment.

5. In combination, a stove having a heating compartment, supports spaced inwardly from the walls of the compartment and above the bottom thereof and comprising angle irons having horizontal and vertically disposed flanges, the vertical flanges having slots formed therein, a frame including side portions slidably mounted upon the horizontal flanges and having parts projecting into the slots to limit the outward movement of the frame, the latter also including front and rear upstanding plate members and a series of rods extending in a horizontal plane from front to rear between said plate members and having their ends supported thereby.

6. In combination, a stove having a heating compartment, spaced supports mounted therein, a frame within the compartment comprising front and rear plates connected by side members slidably disposed upon the supports, a plurality of sets of rods extending between the front and rear plates and cooking utensils depending between the several sets of rods and having projecting portions resting upon the rods whereby the utensils are suspended within the frame.

GEORGE E. PAGE.